April 25, 1944.   R. L. NOYES   2,347,330
FAUCET
Filed Jan. 10, 1941
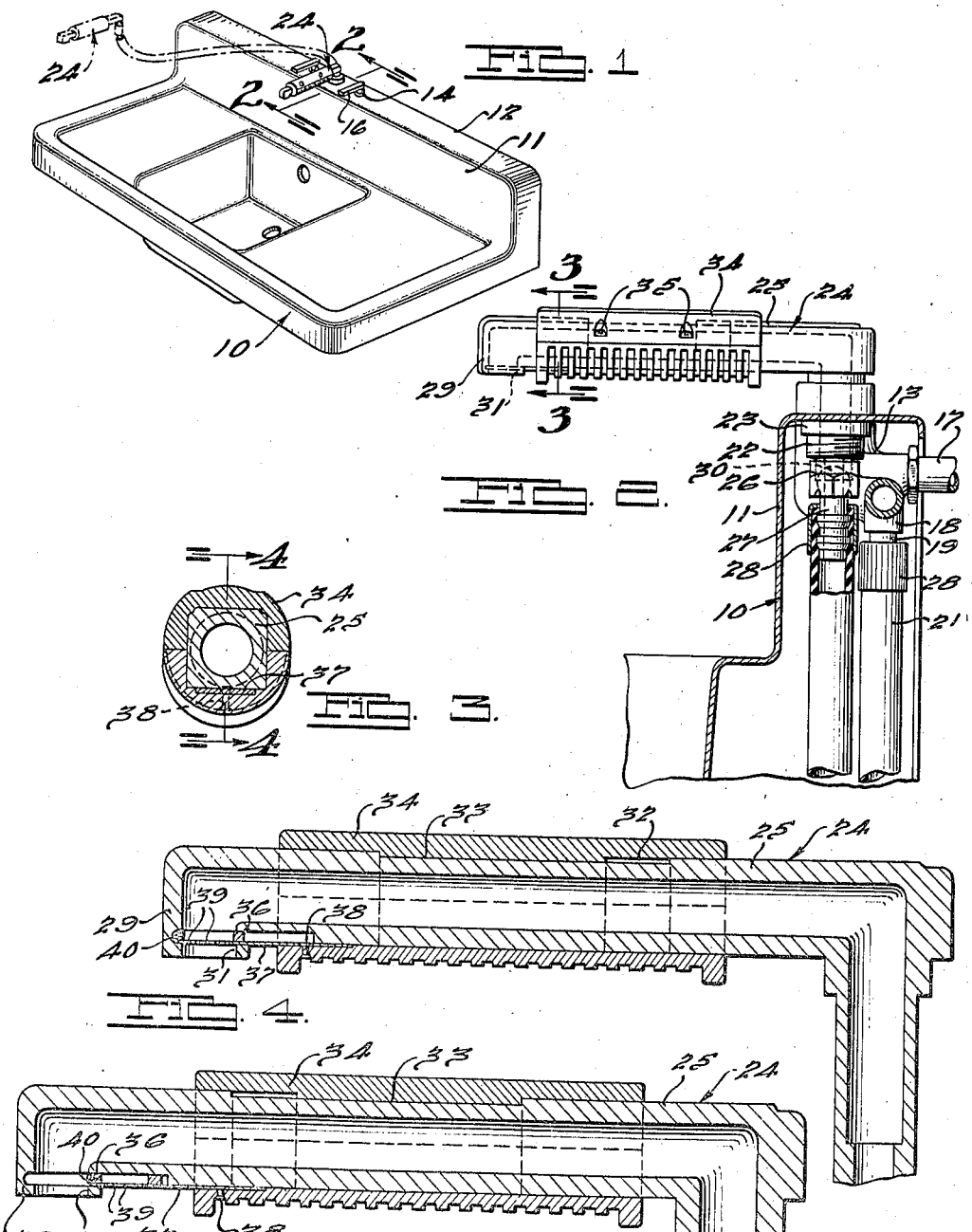
INVENTOR
Roswell L. Noyes.
BY
Harness, Dickey & Pierce
ATTORNEYS Patented Apr. 25, 1944

2,347,330

UNITED STATES PATENT OFFICE 2,347,330

FAUCET

Roswell L. Noyes, Detroit, Mich., assignor to The Murray Corporation of America, Detroit, Mich., a corporation of Delaware Application January 10, 1941, Serial No. 373,991

3 Claims. (Cl. 299—139)

My invention relates to faucets, and particularly to a faucet of new and novel construction which is journaled to swing in a horizontal plane and to be removable to function as a nozzle.

It has been the practice heretofore to provide a spray nozzle in a sink, separate from the faucet thereof. Valve means are provided in the mixing valve to change the flow of fluid from the faucet to the spray nozzle so that the mixing valve may be employed to control the flow of hot and cold water through either the faucet or nozzle.

The present invention contemplates employing the faucet as the nozzle by having the swinging arm thereof disposed in a bushing from which it may be removed. A hose connection is employed to connect the mixing valve to the faucet end and a handle is provided on the faucet having a plate which is adjustable over the end of the faucet to change the direct flow of water from its end to a spray. This construction provides the advantage of having the nozzle deliver a full stream of water for filling containers which otherwise could not be placed under the faucet, and to deliver a spray for spraying dishes and the like.

Accordingly, the main objects of my invention are: to mount a swingable faucet in a bearing from which it may be removed; to journal a faucet in a bearing which permits the faucet to swing in the horizontal plane and connect a hose between the mixing valve and the faucet to permit the latter to be removed and employed as a nozzle; to provide a removable faucet with a hose connected to a mixing valve and with a handle which controls the delivery of a full stream of water or a spray when the faucet is journaled for movement in a horizontal plane or when removed from its support and employed as a nozzle; to provide a faucet with a handle and a projecting plate having a plurality of apertures which is adjusted over the delivery opening to change the direct flow of water to a spray; and in general, to provide a faucet and nozzle for a sink in a combination which simplifies the construction and which increases the usefulness of the faucet.

Other objects and features of novelty of my invention will be either specifically pointed out or will become apparent when referring, for a better understanding of my invention, to the following description taken in conjunction with the accompanying drawing, wherein:

Figure 1 is a perspective view of a sink containing a faucet which embodies features of my invention;

Fig. 2 is an enlarged sectional view of structure illustrated in Fig. 1, taken on the line 2—2 thereof;

Fig. 3 is an enlarged sectional view of the structure illustrated in Fig. 2, taken on the line 3—3 thereof;

Fig. 4 is an enlarged sectional view of the structure illustrated in Fig. 3, taken on the line 4—4 thereof, with the parts in position to produce a spray of water; and, Fig. 5 is a view of the structure illustrated in Fig. 4, with the spray element retracted to permit a full flow of water from the nozzle.

The sink 10 illustrated in Figs. 1 and 2 is of the conventional form having a splashboard portion 11 and a flanged rim 12. A mixing valve 13 is supported on the rim 12 by the threaded collars 14 through which valve stems 15 extend and on which operating handles 16 are secured. A hot water conduit 17 is connected to one end of the mixing valve while a similar cold water conduit is connected to the opposite end thereof. Interjacent the valve elements an outlet projection 18 is provided from which a stem 19 extends and to which a flexible hose 21 is secured.

A shouldered threaded bushing 22 extends through an aperture in the rim 12 and is secured in position by a nut 23. A faucet 24 has a horizontally extending tubular portion 25 and a cylindrical vertically extending portion 26, the latter of which fits snugly within the bushing 22 in which it may swivel. A tubular stem 27 extends from the vertically extending portion 26 of the faucet to which the other end of the hose 21 is connected. The ends of the hose are secured by suitable means, herein illustrated as by ferrules 28. The horizontally extending portion 25 of the faucet projects downwardly at the end at 29 providing an opening 31 from which a full stream of water is delivered. A recessed portion 32 on the top of the horizontal portion of the faucet receives a projection 33 of a handle 34 employed for limiting the longitudinal movement of the handle. The handle 34 is made in two parts secured together as by screws 35.

A slot 36 is provided in the downwardly extending portion 29 of the faucet through which a plate 37 is disposed for sliding movement. The plate is secured to the handle by a rivet 38 so as to be moved thereby to advance the end across the opening 31 when the faucet 24 is to function as a spray. The plate 37 is provided with a plurality of fine apertures 39 which are disposed across the opening 31 when the handle 34 is moved to the left, as viewed in Fig. 4, which thereby produces a spray. When the handle is moved to the right the plate 37 moves away from the opening 31 through which a full flow of water may then pass. A sealing washer 40 is secured to the plate to be shifted therewith and to seal the plate relative to the opening 31. The plate itself may be made of a fibre material which functions to seal the plate to the opening. The fibre plate, or a solid fibre washer, may be provided with a plurality of openings 39 to produce a spray.

It will thus be seen that I have invented a faucet and nozzle combination wherein the faucet may be swung in a horizontal plane and through which a full stream of water may be delivered or from which the water may be sprayed. When the nozzle portion is removed from its bearing, tall containers may be filled, or dishes sprayed, depending on the position of the handle 34 and plate 37 relative to the opening 31. The mixing valve 13 is materially simplified by this arrangement since the valve heretofore employed for changing the flow of water from the faucet to the nozzle is eliminated. Advantages are provided by the use of the faucet as a nozzle, since a full stream of water can be delivered for filling tall jars and containers which otherwise could not be filled by the faucet.

The end of the tubular stem 27 may be shaped into a ball 30 supported by a nut 26, which is threaded onto the bushing 22. The ball permits a limited universal movement of the faucet 24 relative to the adjacent end of the hose 21.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. In a faucet construction, a faucet proper having an extending delivery portion, an insulating handle movable on said portion, and a perforated element attached to and movable by said handle across the opening of said faucet portion.

2. In a faucet construction, a faucet proper having an elongated delivery portion, a handle made of insulating material disposed about said delivery portion so as to be movable longitudinally thereof, and a spray element attached to and movable by said handle over the end of said faucet portion.

3. In a faucet construction, a faucet proper having an elongated delivery portion, an insulating handle about said delivery portion which is movable longitudinally thereof, a spray element attached to and movable by said handle across the passageway at the end of said delivery portion, and means for sealing said spray element to said delivery portion.

ROSWELL L. NOYES.